United States Patent
Vallart et al.

(10) Patent No.: US 9,815,568 B2
(45) Date of Patent: Nov. 14, 2017

(54) DEVICE FOR MONITORING A POWER TRANSMISSION SYSTEM OF AN AIRCRAFT, AN AIRCRAFT PROVIDED WITH THE DEVICE, AND THE METHOD USED

(71) Applicant: AIRBUS HELICOPTERS, Marignane (FR)

(72) Inventors: Jean-Baptiste Vallart, Aix En Provence (FR); Setareh Taheri, Aix En Provence (FR); Samuel Leyder, Velaux (FR)

(73) Assignee: AIRBUS HELICOPTERS, Marignane (FR)

( * ) Notice: Subject to any disclaimer, the term of this patent is extended or adjusted under 35 U.S.C. 154(b) by 123 days.

(21) Appl. No.: 15/007,298

(22) Filed: Jan. 27, 2016

(65) Prior Publication Data

US 2016/0221685 A1    Aug. 4, 2016

(30) Foreign Application Priority Data

Jan. 29, 2015   (FR) ...................... 15 00166

(51) Int. Cl.
*G01M 15/14* (2006.01)
*B64D 45/00* (2006.01)
(Continued)

(52) U.S. Cl.
CPC .............. *B64D 45/00* (2013.01); *B64C 27/08* (2013.01); *B64C 27/12* (2013.01); *B64D 31/06* (2013.01); *G01M 13/02* (2013.01); *B64C 27/82* (2013.01)

(58) Field of Classification Search
USPC .......................................... 73/112.01, 112.03
See application file for complete search history.

(56) References Cited

U.S. PATENT DOCUMENTS 3,930,366 A    1/1976    Nelson
4,522,025 A    6/1985    Greune et al.
(Continued)

FOREIGN PATENT DOCUMENTS

EP    1310646 A2    5/2003
EP    1310646 A3    12/2004
(Continued)

OTHER PUBLICATIONS

French Search Report for French Application No. 1500166, Completed by the French Patent Office dated Nov. 24, 2015, 9 Pages.

*Primary Examiner* — Eric S McCall
(74) *Attorney, Agent, or Firm* — Brooks Kushman P.C.

(57) ABSTRACT

A method of monitoring a power transmission system of an aircraft, the aircraft including at least one main rotor driven in rotation by a rotor mast and an auxiliary unit having an auxiliary rotor. Control means control the auxiliary rotor. A power relationship is determined providing a first reduced power parameter of the auxiliary unit as a function of a position (POS) of the control means. A setpoint limit is set for a second power parameter for the rotor mast. A current position (POSACTU) of the control means is determined and a calculated value (Vcal) is also determined at least by applying the current position (POSACTU) to the power relationship. A limit value that is not to be exceeded by a power plant is determined, with the limit value being equal to the sum at least of the setpoint limit plus the calculated value.

15 Claims, 2 Drawing Sheets

(51) Int. Cl.
  *B64C 27/12* (2006.01)
  *B64D 31/06* (2006.01)
  *B64C 27/08* (2006.01)
  *G01M 13/02* (2006.01)
  *B64C 27/82* (2006.01)

(56) References Cited

U.S. PATENT DOCUMENTS

| | | | |
|---|---|---|---|
| 5,775,090 A | 7/1998 | Skarvan | |
| 9,193,453 B2 | 11/2015 | Vallart et al. | |
| 2016/0001880 A1* | 1/2016 | Vallart | G05D 1/0072 701/3 |
| 2016/0376017 A1* | 12/2016 | Rossotto | F02C 6/206 701/99 |
| 2017/0066541 A1* | 3/2017 | Rossotto | B64C 27/12 |
| 2017/0144752 A1* | 5/2017 | Vallart | B64C 27/14 |

FOREIGN PATENT DOCUMENTS

| | | |
|---|---|---|
| EP | 2749496 | 7/2014 |
| FR | 2278576 | 2/1976 |
| FR | 2541725 | 8/1984 |

\* cited by examiner

DEVICE FOR MONITORING A POWER TRANSMISSION SYSTEM OF AN AIRCRAFT, AN AIRCRAFT PROVIDED WITH THE DEVICE, AND THE METHOD USED

CROSS REFERENCE TO RELATED APPLICATION

This application claims priority to French patent application No. FR 15 00166 filed on Jan. 29, 2015, the disclosure of which is incorporated in its entirety by reference herein.

BACKGROUND OF THE INVENTION (1) Field of the Invention

The present invention relates to a monitoring device for monitoring a power transmission system of an aircraft, to an aircraft fitted with the monitoring device, and to the method used.

(2) Description of Related Art

In particular, the aircraft is a rotorcraft having a main rotor providing the rotorcraft with at least part of its lift and possibly also propulsion. The rotorcraft also has at least one auxiliary member for controlling its movement in yaw.

In particular, and by way of example, a helicopter may include both a main rotor and an auxiliary member that are driven in rotation by a power plant. Such an auxiliary member may for example be provided with a rotor that is referred to below as an "auxiliary" rotor.

Furthermore, the power plant is mechanically connected to each rotor by a power transmission system.

Helicopters are provided with a power plant that comprises at least one engine. By way of example, such an engine may be a free-turbine turboshaft engine. Each engine has a drive shaft that rotates at high speed. In contrast, the main rotor of a helicopter rotates at a low speed, lying substantially in the range 200 revolutions per minute (rpm) to 400 rpm. Under such circumstances, the power transmission system includes a gearbox for reducing speed of rotation, which gearbox is interposed between the engines and the main rotor. Such a gearbox for reducing speed of rotation is referred to as a main gearbox (MGB).

Consequently, each engine is connected to the main gearbox of a power transmission system, the main gearbox being connected to the main rotor and possibly also the auxiliary rotor.

In particular, the main gearbox drives a rotor mast in rotation. The rotor mast then drives the main rotor in rotation.

Furthermore, the main gearbox drives the auxiliary rotor in rotation via an auxiliary power transmission and a tail gearbox. Under such circumstances, the tail gearbox may be interposed by way of example between the auxiliary power transmission and the auxiliary rotor.

The person skilled in the art uses the term "rear tail unit" to designate the unit comprising the auxiliary power transmission, the tail gearbox, and the auxiliary rotor. This unit is also referred to below as the "auxiliary" unit.

Furthermore, in order to guarantee mechanical integrity of the power plant, three engine-monitoring parameters are conventionally defined and limited, namely: the temperature known as "T4" of the gas in the combustion chamber of each engine; the speed of rotation Ng of the gas generator in each engine; and the torque Tq exerted on a drive shaft of each engine that is connected to the main gearbox.

In addition, a manufacturer applies limits in order to protect the inlet of the main gearbox, the rotor mast, and the auxiliary unit from excessive torque.

A manufacturer then tends to protect a power transmission system by setting limits for torque exerted on the rotor mast, torque exerted on the mechanical connections linking the engines to the main gearbox, and torque exerted on the auxiliary unit.

The various limits on the power plant and the power transmission system are set so as to prevent mechanical degradation of the various members concerned.

Which limit is the most constricting depends on the stage of flight. In general manner, at low altitude (i.e. below about 3000 meters (m)) and in the absence of an engine failure, the limit for the torque that may be exerted on the rotor mast is found to be the limit that is the most constraining.

In addition, for reasons of cost and of difficulty in implementing a torque meter, it is only the engines that are generally provided with such torque meters. Each engine thus has a respective torque meter arranged on its drive shaft so as to enable the measured torque to be compared with an intrinsic torque limit of the engine. A torque meter is thus used firstly for the purpose of avoiding the engine exceeding its own torque limit.

Nevertheless, a manufacturer may also use the torque meter of each engine to monitor the power transmission system.

The torque limit for application to each connection linking an engine to the main gearbox can thus be monitored by using the measurements from the torque meters.

Specifically, the power developed by a rotary member or exerted on that rotary member is equal to the torque exerted on the rotary member multiplied by its speed of rotation.

Consequently, and in accordance with the prior art, a manufacturer determines the limit power that can be developed upstream from the main gearbox and deduces a torque limit therefrom. This torque limit is referred to as the "gearbox inlet torque limit" in order to distinguish it from the intrinsic torque limit of each engine.

In order to determine this limit power, the following power relationship is used:

$$Peng = P1 + P2$$

where "Peng" represents the maximum authorized power for the engines, "P1" represents the maximum authorized power on the rotor mast, and "P2" represents the power absorbed by the auxiliary unit.

The power absorbed by the auxiliary unit is generally not associated with a torque limit on that auxiliary unit because of the very high speeds of rotation of the parts in the auxiliary unit.

The maximum authorized power for the engines is defined by mechanical constraints set by the manufacturer of the aircraft, with these constraints generally differing from the limits imposed by the engine manufacturer.

The limit power applicable to each engine is obtained from the maximum authorized power for the engines in application of a predefined distribution of power. For example, distributing power equally between the engines of a twin-engined rotorcraft leads to defining a limit power for each engine that is equal to half the maximum authorized power for the engines.

This power relationship may include a variable that is adjustable, e.g. in order to take account of power losses caused by the operation of the main gearbox. Likewise, this relationship may include a variable that is adjustable in order to take account of the possibility of power being taken off from the power transmission system in order to perform accessory operations.

In addition, the maximum authorized power P1 on the main rotor is a power constant defined by the manufacturer.

In addition, in the absence of any torque measurement on the auxiliary unit in the prior art, the manufacturer evaluates the power P2 absorbed by the auxiliary unit as a function of the stage of flight.

Thus, at low speed, the power P2 absorbed by the auxiliary unit is equal to a first constant. This first constant usually corresponds to an estimate of the power P2 absorbed by the auxiliary unit during a stage of hovering flight, with this stage of hovering flight being performed while the engines are delivering a level of power known as "maximum takeoff power" (TOP) and under the French expression "puissance maximal au &collage" corresponding to the acronym PMD.

During a stage of cruising flight, the power P2 absorbed by the auxiliary unit is equal to a second constant. This second constant usually corresponds to an estimate of the power P2 absorbed by the auxiliary unit during a stabilized stage of level flight, this stabilized stage of level flight being performed while the engines are delivering a level of power known as "maximum continuous power" (MCP).

Consequently, the aircraft has equipment that determines the current stage of flight and that deduces therefrom the power being absorbed by the auxiliary unit. This power P2 absorbed by the auxiliary unit can be referred to as an "assumed" power, given that it is based on assumptions that are not necessarily true under all circumstances.

By summing the maximum power P2 consumed by the auxiliary unit and the maximum authorized power P1 on the rotor mast, equipment on board the aircraft can determine the maximum power Peng that the power plant can deliver while not damaging the power transmission system. Under such circumstances, a gearbox inlet torque limit is established for each engine as a function of the speed of rotation of the members being monitored, and in particular a drive shaft of each engine.

A monitoring device can then display this gearbox inlet torque limit together with the current torque measurement as delivered by the torque meter of an engine.

That method thus makes it possible to monitor a power transmission system while using only the torque meters of the engines. That method presents the advantage of not requiring the use of a torque meter that is located on the auxiliary unit or on the rotor mast.

Nevertheless, for the mechanical limits of the power transmission system, the gearbox inlet torque limit is thus established on the basis of an "assumed" level of power being consumed by the auxiliary unit.

This assumed consumption can turn out to be rather inaccurate, for example when performing a sideways movement during hovering flight or in the presence of a gust of cross wind.

This inaccurate estimate of the power being absorbed by the tail unit can then lead to artificial limits being put on the performance on the aircraft in order to guarantee compliance with mechanical limits under said particular stages of flight.

For example, in order to combat a cross wind while hovering, and as a function of the direction of the cross wind, the cross wind may require thrust from the auxiliary rotor to be increased relative to an equilibrium situation without wind, as was used to quantify the assumed level of power absorbed by the auxiliary unit.

Consequently, the auxiliary rotor consumes power that is greater than the assumed power that has been used to establish the maximum authorized power for the engines on the basis of the power relationship. Under such circumstances, the maximum authorized power for the engines is not sufficient to obtain the maximum authorized power in the rotor mast as used in that power relationship.

As a result, the real power that is actually transmitted to the rotor mast is less than the imposed maximum power. This situation leads to an arbitrarily restrictive limit on the performance of the aircraft under difficult flight circumstances.

The technological background includes the following documents: FR 2 278 576; FR 2 541 725; and U.S. Pat. No. 5,775,090.

Document FR 2 278 576 describes a system for controlling a helicopter having two lift rotors.

Document FR 2 541 725 describes an installation for controlling the distribution of load and the speed of rotation of gas turbine installations.

Document U.S. Pat. No. 5,775,090 describes a method of determining a torque signal for a gas turbine.

Documents EP 1 310 646 and EP 2 749 496 are also known.

BRIEF SUMMARY OF THE INVENTION

Consequently, the present invention seeks to provide a method tending to optimize the monitoring of a power transmission system of an aircraft, and in particular an aircraft having two rotors driven by a main gearbox.

The invention thus provides a method of monitoring a power transmission system of an aircraft, the aircraft including at least one main rotor driven in rotation by the power transmission system, the power transmission system comprising a main gearbox connected to the main rotor by at least one rotor mast. The aircraft also includes an auxiliary unit with an auxiliary rotor and a mechanical assembly of the power transmission system, the mechanical assembly mechanically connecting the auxiliary rotor to the main gearbox. The aircraft is also provided with a power plant comprising at least one engine for driving the main gearbox. Finally, the aircraft includes control means for controlling the auxiliary rotor, e.g. such as pedals.

The method comprises the following steps:

determining a power relationship providing a first power parameter for said auxiliary unit as a function of a position of said control means, said first power parameter being a power parameter reduced by at least one reduction variable;

setting a setpoint limit for a second power parameter for said rotor mast;

determining a value referred to as an "intermediate" value of the first power parameter corresponding to said current position in application of said power relationship;

measuring a value referred to as a "current" value of each reduction variable;

correcting said intermediate value at least by using each current value in order to obtain a non-reduced value referred to as the "calculated" value; and determining a value referred to as a "limit" value that is not to be exceeded by a monitoring parameter of said power plant, said limit value being equal to the sum of at least said setpoint limit plus said calculated value.

Consequently, the invention proposes defining a power relationship for the auxiliary unit, e.g. by testing. During such testing, a manufacturer may arrange a torque meter on the auxiliary unit in order to determine the value of a "first" power parameter as a function of the position of the control means.

Depending on the variant, the first power parameter may be in the form of a torque or else of a power, which power is equal to the product of the measured torque multiplied by a measured speed of rotation of an element of the auxiliary unit.

Furthermore, the first power parameter to which the power relationship relates is a variable that is reduced as a function of various reduction variables. The first power parameter may for example be reduced by using reduction variables that relate to air data.

A given position of the control means may correspond to various power levels as a function of parameters of the surroundings that can have an influence on the power that is absorbed by the auxiliary unit.

Consequently, the method suggests taking these parameters of the surroundings into consideration via reduction variables. These parameters of the surroundings are then used for modifying at least in part the power parameter provided by the power relationship.

Thus, the term "said first power parameter being a power parameter reduced by at least one reduction variable" designates a power parameter that has been at least in part dimensionless by using each reduction variable.

These parameters of the surroundings that have an influence are identified by using correlation methods between their own variations and variations in the power absorbed by the auxiliary unit. Consequently, a manufacturer undertakes test flights during which the power absorbed by the auxiliary unit is stored together with the values of various variables.

At least one reduction variable may optionally be a variable measured by an air data computer of the aircraft. Thus, at least one reduction variable may be selected from a list comprising at least one of the following parameters: the relative density of the air; the temperature and the pressure of the outside air; a speed of advance of the aircraft; and a vertical speed of the aircraft.

The term "speed of advance" is used to mean the speed of the aircraft in a longitudinal direction of the aircraft. The speed of advance may be the indicated air speed, for example.

The term "vertical speed" means a travel speed of the aircraft in the gravity direction.

The manufacturer then identifies the reduction variables that have an influence on the power absorbed by the auxiliary unit. The first power parameter is dimensionless at least in part by using the reduction variables. The manufacturer also prepares the power relationship on the basis of the test results. This power relationship thus provides a reduced first power parameter as a function of a position of control means controlling the auxiliary rotor.

In operational flights, the invention sets out to measure the current position of the control means. This current position may be measured by conventional means, such as an angle sensor, or indeed a unit known as the "trim" unit. Consequently, the term "determining a current position" means determining the value of a parameter that is representative of the position of the control means at a given instant.

This current position can then be used by being put into the power relationship that has been prepared in order to deduce therefrom an "intermediate" value.

Under such circumstances, the intermediate value is a reduced power parameter.

Consequently, the current value of each position variable is measured and is used for converting the reduced first power parameter into a non-reduced parameter.

The intermediate value is then corrected at least by using the current value of each reduction variable in order to obtain a "calculated" value of a non-reduced power parameter. The term "corrected at least" means that the intermediate value is necessarily corrected by using current values of the reduction variables, and is then possibly corrected using an additional correction, depending on the implementation.

By way of illustration, the first power parameter may be modified by being divided by the density of the air.

In one method, the manufacturer acts during a testing stage to establish the power absorbed by the auxiliary unit over the travel range of the control means under standard flight circumstances occurring in a variety of atmospheric conditions.

The results of the testing stage make it possible to prepare the power relationship that gives a first power parameter reduced by the relative density of the air.

While the method is being applied, the aircraft determines the current value of the relative density of the air and also the current position of the control means.

By inputting this current position into the power relationship, the members of the aircraft determine an intermediate value.

The calculated value is then a function at least of the product of the intermediate value multiplied by the current value of the current relative density of the air. Depending on the implementation, the calculated value may for example be equal either to this product or else to this product corrected by a power margin.

This calculated value is used to determine a limit value relating to a monitoring parameter of the power plant. The monitoring parameter may be a torque or a power. For example, the calculated value can be used to determine a maximum total power that can be developed by a power plant, this maximum total power serving to prepare a limit torque to be complied with on a drive shaft of each engine.

Consequently, the prior art determines the limit value of a limit power parameter while making use only of an assumed power value. The invention proposes a different method of determining this limit value, this method being based on an estimator that uses a power relationship as a function of the position of the control means and it also makes use of at least one reduction variable.

Under such circumstances, the invention tends to optimize determination of the limit value. Specifically, the power absorbed by the auxiliary unit is associated with the order given by a human pilot or an autopilot via control means, and thus to the position of the control means. Consequently, the limit value determined in application of the invention tends to be more accurate than the limit value determined solely by using an assumed power.

Specifically, this method is not obvious insofar as the power that is absorbed by the auxiliary unit depends on a variety of factors, and in particular on air flow conditions.

The method may be combined with applying bounds seeking to bound the power developed by each engine.

Specifically, the aircraft may include a management member for each engine, such as for example a full authority digital engine control (FADEC). By way of example, the management member may control the rate at which fuel is delivered to the engine so that the power developed by each engine does not exceed high and/or low limits, at least while the engine is operating in certain power ratings.

These power bounds seek to guarantee that the aircraft is pilotable when a pilot acts on the collective pitch of the blades of the main rotor. These bounds can also guarantee mechanical integrity of the power transmission system and they can maintain a level of performance for the aircraft in the event of a malfunction of the device applying the invention, e.g. a malfunction of the system that measures the current position of the control means.

For example, an engine may be operated to deliver a maximum transient power (MTP), a maximum takeoff power (TOP), or a maximum continuous power (MCP). A multi-engined helicopter may also have at least one contingency power rating that is used in the event of an engine failing.

In order to ensure easy pilotability of the collective pitch of the main rotor, such bounds may be applied so as to create a margin between the maximum transient power MTP and the maximum takeoff power TOP, or the maximum continuous power MCP, depending on the stage of flight.

In addition, the maximum transient power MTP may be restricted by the management member using an upper bound to avoid exceeding the contingency power, and using a lower bound in order to guarantee some minimum level of performance in the event of the method of the invention malfunctioning. Likewise, a lower bound for the maximum continuous power MCP may be used.

The method may also include one or more of the following characteristics.

Thus, by way of example, the setpoint limit that is used may be a setpoint for the power absorbed by the rotor mast.

A manufacturer can determine the maximum admissible power at the rotor mast in conventional manner. The setpoint limit then represents this maximum admissible power.

Furthermore, the limit value may be:

either equal to the sum of said setpoint limit plus said calculated value;

or else equal to the sum of said setpoint limit plus said calculated value plus a predetermined takeoff power.

Under such circumstances, a manufacturer may optimize determination of the limit value by taking into consideration power that is taken off, in particular from the power transmission system. By way of example, such power takeoff may comprise power losses associated with the operation of each gearbox and/or power taken off to operate alternators or pumps and/or power taken off to operate an air conditioning and/or heating system of the aircraft, . . . .

Furthermore, the limit value may be used for determining a limit torque for each engine.

Thus, when the limit value represents a power, this limit value can be used to obtain a limit torque that is not to be exceeded by each engine. The limit value is thus divided by the speed of rotation of the drive shaft of the engine in order to obtain the limit torque.

In a multi-engined aircraft, power distribution between the engines may be adjusted so as to determine the maximum limit torque that is to be developed by each engine.

Under such circumstances:

a current torque developed by each engine is measured; and said current torque of an engine is compared with the associated limit torque.

The comparison can lead to conventional operation.

For example, an indicator may display the limit torque and the current torque so as to enable a pilot to verify that the current torque does not exceed the limit torque.

An indicator may also process various monitoring parameters and display information about the monitoring parameter that is the closest to its own limit and/or that has the greatest normalized value from among a plurality of monitoring parameters.

For example, the management member of each engine may control the rate at which fuel is delivered to the engine so that said current torque does not exceed the limit torque, at least while the engine is operating at certain power ratings.

In a first implementation, the calculated value is equal to the intermediate value corrected by each current value.

Under such circumstances, the intermediate value is corrected solely by using each current value in order to obtain the non-reduced calculated value.

This first implementation makes it possible to obtain a power relationship that is relatively accurate.

In order to improve accuracy, and in a second implementation, the following steps are performed in order to determine the calculated value:

determining a current flight stage of the aircraft;

determining an assumed power value as a function of the current flight stage;

determining a non-reduced calculation value equal to said intermediate value corrected by each current value; and if said calculation value is less than said assumed power value, said calculated value is equal to the sum of a predetermined accuracy margin plus said calculation value, said calculated value being bounded by said assumed power value in order to be no greater than said assumed power value; or if said calculation value is greater than said assumed power value, said calculated value is equal to the difference of said calculation value minus said accuracy margin, said calculated value being bounded by said assumed power value so as to be no less than said assumed power value.

The intermediate value is then corrected by using the reduction variables and the accuracy margin.

This second implementation consists in comparing the non-reduced calculation value supplied by the estimator provided by the invention with an assumed level of power consumption, e.g. the assumed power consumption level that is used in some of the prior art.

Thus, by way of example, the assumed power value is equal to a first constant while the aircraft is flying at a speed of advance less than a predetermined speed threshold, and the assumed power value is equal to a second constant while said aircraft is flying at a speed of advance greater than or equal to the predetermined speed threshold.

Below the assumed power value, the calculation value that is obtained by applying the power relationship is overestimated by an accuracy margin in order to obtain the calculated value. This accuracy margin may correspond to half the accuracy range of the power relationship, which range is known as a result of analyzing tests.

Above the assumed power value, the calculation value is underestimated by the accuracy margin in order to obtain the calculated value.

This second implementation thus takes into consideration the existence of an accuracy margin for the power relationship.

In addition to a method, the invention provides a monitoring device for monitoring a power transmission system of an aircraft, said aircraft including at least one main rotor driven in rotation by said power transmission system, said power transmission system comprising a main gearbox connected to said main rotor by at least one rotor mast, said aircraft including an auxiliary unit with an auxiliary rotor and a mechanical assembly of said power transmission system, said mechanical assembly mechanically connecting said auxiliary rotor to said main gearbox, said aircraft including a power plant comprising at least one engine for driving said main gearbox, said aircraft including control means for controlling said auxiliary rotor.

The monitoring device is designed to apply the above-described method. The monitoring device thus includes a processor unit having calculation means and a memory, the monitoring device including a measurement system for measuring the current position of the control means, the processor unit being connected to the measurement system that measures the current position of the control means, the memory storing instructions together with said power relationship and said setpoint limit, the calculation means executing said instructions in order to apply said method of the invention.

The stored power relationship may be in the form of a mathematical relationship, or in the form of a table of values stored in a database, for example.

The monitoring device includes an air data computer connected to the processor unit.

The monitoring device also includes one torque meter per engine measuring a current torque on a shaft extending between the engine and the main gearbox.

In addition, the monitoring device may include a display device for displaying a limit that is a function of the limit value.

In addition to a monitoring device, the invention provides an aircraft including at least one main rotor driven in rotation by a power transmission system, said power transmission system comprising a main gearbox connected to said main rotor by at least one rotor mast, said aircraft including an auxiliary unit with an auxiliary rotor and a mechanical assembly of said power transmission system, said mechanical assembly mechanically connecting said auxiliary rotor to said main gearbox, said aircraft including a power plant comprising at least one engine for driving said main gearbox, said aircraft including control means for controlling said auxiliary rotor.

The aircraft then includes a monitoring device of the invention.

BRIEF DESCRIPTION OF THE SEVERAL VIEWS OF THE DRAWINGS

The invention and its advantages appear in greater detail from the following description of examples given by way of illustration and with reference to the accompanying figures, in which.

Elements present in more than one of the figures are given the same references in each of them.

DETAILED DESCRIPTION OF THE INVENTION

Figure 1:
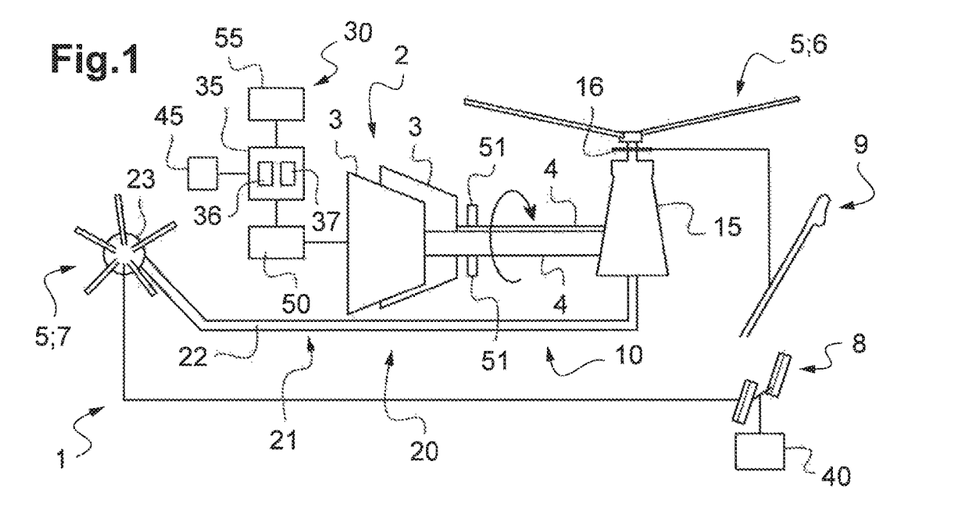
FIG. 1 is a view of an aircraft of the invention.

FIG. 1 shows an aircraft 1 of the invention.

The aircraft 1 has at least two rotors 5. In particular, the aircraft 1 shown diagrammatically has a main rotor 6 providing the aircraft 1 with at least some of its lift and propulsion. The aircraft 1 also has an auxiliary unit 20 with an auxiliary rotor for controlling yaw movement of the aircraft 1. Consequently, the aircraft 1 in FIG. 1 is a rotorcraft, and more precisely a helicopter.

In order to control this aircraft, a pilot operates flight controls.

Thus, the aircraft 1 has controls 9 for controlling the pitch of the blades of the main rotor cyclically and/or collectively. Consequently, and by way of example, these controls 9 may include a cyclic stick and a collective lever respectively for controlling the cyclic pitch and the collective pitch of the blades of the main rotor 6.

Furthermore, the aircraft 1 has control means 8 for controlling the pitch of the blades of the auxiliary rotor 7. Such control means 8 may be in the form of pedals, for example.

In order to drive the rotors 5, the aircraft 1 has a power plant 2. The power plant includes at least one engine 3, e.g. of the turboshaft type.

Each engine 3 has a drive shaft 4 suitable for driving a power transmission system 10 that is interposed between the power plant 2 and the rotors 5.

The power transmission system 10 includes a main gearbox 15. The main gearbox 15 is mechanically connected to each drive shaft 4 by conventional connections. Furthermore, the main gearbox 15 is mechanically connected to each rotor 5.

Under such circumstances, the main gearbox 15 drives rotation of a rotor mast 16 secured to the main rotor 6. The rotor mast may be a rotary member of the main gearbox 15.

Furthermore, the main gearbox 15 is mechanically connected to the auxiliary rotor 7 by a mechanical assembly 21 of said power transmission system 10. The mechanical assembly 21 and the auxiliary rotor together form an auxiliary unit 20. By way of example, this mechanical assembly comprises a conventional auxiliary power transmission 22 and a tail gearbox 23.

Consequently, the engines 3 drive the main gearbox 15, with this main gearbox 15 driving the rotors 5.

The aircraft 1 also has a monitor device 30 for monitoring and/or controlling the operation of the power transmission system 10.

The monitor device 30 includes a processor unit 35 having calculation means 36 and a memory 37. The calculation means 36 may comprise at least one processor or the equivalent. The memory may comprise one or more conventional storage units. Under such circumstances, the processor unit may be a unit of the kind known as an aircraft flight control system (AFCS).

The memory 37 contains instructions suitable for being executed by the calculation means 36. In addition, the memory 37 contains a power relationship and a setpoint limit as predefined by the manufacturer.

The power relationship may be in the form of at least one mathematical equation, or it may be in the form of a table of values, for example. This power relationship provides a first power parameter as a function of a position of the control means.

Consequently, the processor unit executes the stored instructions in order to apply the method of the invention so as to determine a limit for the power transmission system 10, in particular as a function of the control means. This limit is in the form of the value for a parameter referred to as the "limit value Peng".

Under such circumstances, the processor unit is connected by a wired or wireless connection to a measurement system 40 that measures a current position POSACTU of said control means 8.

Figure 2:
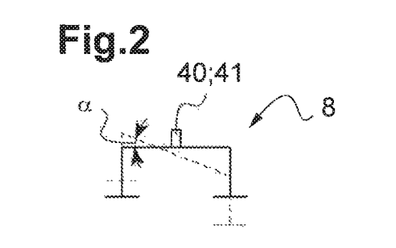
FIGS. 2 and 3 are views explaining measurement systems suitable for measuring a current position of control means.

In the variant of FIG. 2, the measurement system 40 comprises an angle sensor measuring an angle a present between a reference and a rod of the control means 8.

Figure 3:
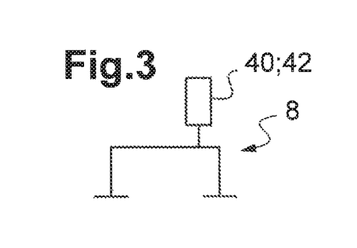

In the variant of FIG. 3, the measurement system 40 comprises a trim unit 42, where such a trim unit conventionally enables the value of a parameter concerning the position of the control means 8 to be determined.

Furthermore, the first power parameter is a parameter that has been reduced by at least one reduction variable. For example, a reduction variable may depend on air data.

In one option, the monitoring device 30 then includes an air data computer 45 connected to the processor unit 35 by a wired or wireless connection. The air data computer 45 then transmits information about the values of various reduction variables. In particular, the air data computer 45 transmits information to the processor unit enabling it to calculate the relative density a of the air, the temperature and the pressure of the outside air, an air speed of the aircraft, and a vertical speed of the aircraft.

In addition, or as an alternative, the monitor device includes a display device 55 for displaying information about the limit value Peng as determined by the processor unit 35. The term "information about the limit value" means data that is equal to the limit value, or data that is determined on the basis of the limit value.

Furthermore, the monitor device 30 includes one torque meter 51 per engine. Each torque meter measures the current torque on a shaft, and in particular a drive shaft 4 extending from the engine 3 to the main gearbox 15.

For example, the processor unit communicates with a management member 50 of each engine, which management member 50 is connected to a torque meter.

Under such circumstances, the monitor device presents instruments for determining data values that depend on atmospheric conditions and on flight circumstances. These values are transmitted to the processor unit in order to establish the limit value Peng.

The processor unit may include a subassembly for making use of the limit value Peng, e.g. a vehicle management system. For example, the processor unit deduces therefrom a limit torque compared with a current torque for each engine in order to obtain an accurate image of the available power margin. This power margin may then optionally be transmitted by the processor unit to the display unit 55 in order to enable the pilot to assess the power limits of the aircraft.

The limit value Peng may also be transmitted for processing to the management members 50.

Under such circumstances, the monitoring device can apply the method of the invention.

Figure 4:
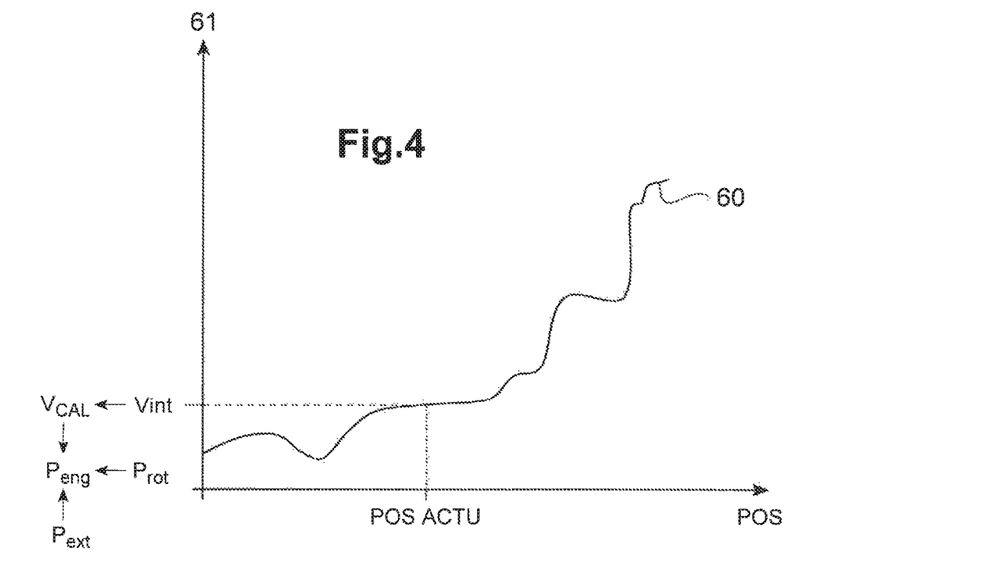
FIG. 4 is a graph showing the first implementation.

FIG. 4 is a graph illustrating the first implementation.

Whatever the implementation, a manufacturer uses testing or simulation to determine a power relationship 60 that provides a first power parameter 61 for the auxiliary unit 20 as a function of a position POSACTU of the control means 8.

For each possible position of the control means 8, applying the power relationship provides a single value for the first power parameter 61.

This first power parameter is a power that has been reduced by at least one reduction variable, or indeed a torque that has possibly been reduced by at least one reduction variable, for example.

By way of example, at least one reduction variable is a variable measured by the air data computer 45 of the aircraft. In particular, at least one reduction variable may be selected from a list comprising the relative density σ of the air, the temperature and the pressure of the outside air, a speed of advance the aircraft, and a vertical speed of the aircraft.

For example, the first power parameter may be a power divided by the relative density σ of the air.

Furthermore, the manufacturer determines a setpoint limit Prot for a second power parameter representing the power being absorbed by the rotor mast 16. Like the first power parameter, the second power parameter may be a power as such, a power reduced by at least one reduction variable, or indeed a torque possibly reduced by at least one reduction variable, for example. In particular, the setpoint limit Prot may be a setpoint limit not to be exceeded for the power absorbed by the rotor mast.

The power relationship 60 and the setpoint limit Prot are stored in the memory 37 of the processor unit 30.

On each calculation instant, the processor unit estimates the limit value Peng.

Under such circumstances, the processor unit 30 determines the current position POSACTU of the control means 8 on the basis of data transmitted by the measurement system 40.

Thereafter, the processor unit 30 determines a calculated value Vcal. This calculated value Vcal represents the power absorbed by the auxiliary unit.

Under such circumstances, the processor unit determines an intermediate value Vint by applying the current position POSACTU to the power relationship 60.

The term "by applying the current position POSACTU to the power relationship 60" should be understood as meaning that the intermediate value corresponds to the current position POSACTU in application of the power relationship 60.

Furthermore, the processor unit determines a current value Vactu of each reduction variable 65, possibly making use of data from the air data computer.

Under such circumstances, the processor unit converts the intermediate value Vint at least by making use of each current value Vactu in order to obtain a non-reduced calculated value.

In the first implementation, the processor unit converts the intermediate value Vint solely by using each current value Vactu in order to obtain the calculated value Vcal.

In the above example, the current relative density σ of the air is determined. The calculated value Vcal is then equal to the product of the intermediate value Vint and the current relative density σ of the air.

Using this calculated value Vcal, the processor unit determines the limit value Peng that is not to be exceeded by the power plant. This limit value Peng is equal to the sum of at least the setpoint limit Prot plus the calculated value Vcal.

In a first configuration, the limit value Peng is equal to the sum of the setpoint limit Prot plus the calculated value Vcal, i.e.:

$$Peng=Prot+Vcal$$

In a second configuration, the limit value Peng is equal to the sum of the setpoint limit Prot plus the calculated value Vcal plus predetermined takeoff powers Pext, i.e.:

$$Peng=Prot+Vcal+Pext$$

The predetermined takeoff powers Pext are either set by the manufacturer or else they are determined as a function of data coming from measurement devices provided for this purpose.

This second configuration serves to improve the quality of the estimate of the limit value Peng by taking into consideration the power taken off by various members of the aircraft.

As a function of the nature of the setpoint limit and of the calculated value, the limit value may be in the form of a limit torque.

Nevertheless, in one implementation, the setpoint limit and the calculated value represent powers.

Under such circumstances, the processor unit makes use of the limit value Peng to obtain a respective limit torque Tqlim that is not to be exceeded by each engine.

In a single-engined aircraft, the limit torque Tqlim is obtained by dividing the limit value Peng by the speed of rotation of the drive shaft 4 of the engine.

In a multi-engined aircraft, the processor unit determines a limit power for each engine so that the power plant generates the limit value, and it then deduces a limit torque for each engine therefrom.

These limit torques are then used by equipment of the aircraft using possibly conventional methods, for example the management members 50.

By way of example, the processor unit determines a current torque Tqactu being developed by each engine 3 on the basis of the data from the torque meters 51, and then compares the current torque Tqactu of each engine with the associated limit torque Tqlim. The processor unit thus determines a torque margin, which is transmitted to the display device 55 or indeed to the management members 50 and to the processor unit 35 for processing.

In the first implementation of FIG. 4, the calculated value Vcal is thus obtained directly by converting the intermediate value Vint into a parameter that is not reduced with the current values of the reduction variables.

Figure 5:
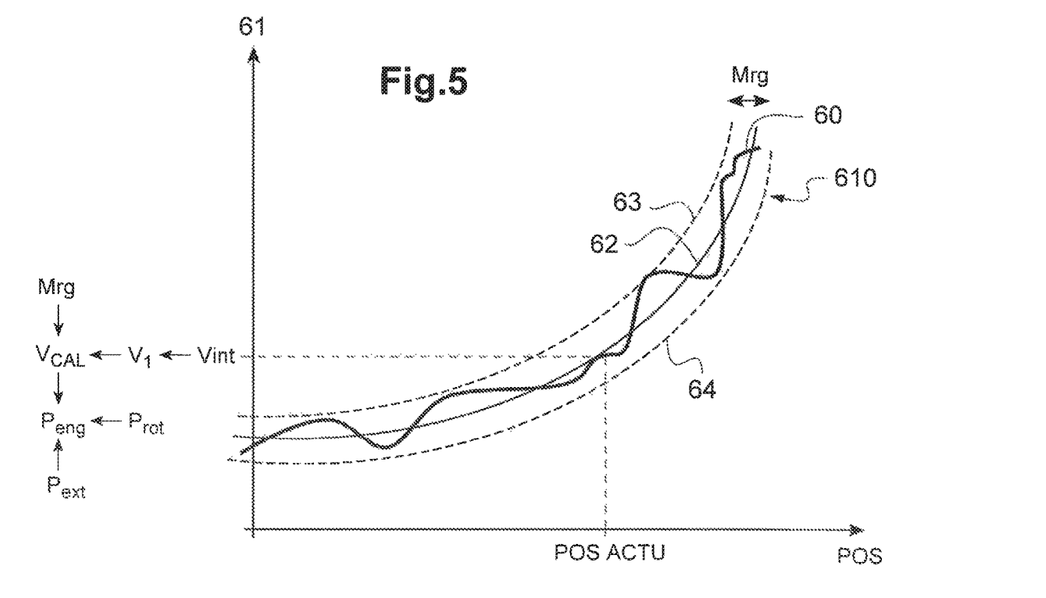
FIG. 5 is a graph showing the second implementation.

In the second implementation of FIG. 5, the power relationship 60 is accurate to a greater or lesser extent. This power relationship 60 thus lies within an envelope 610. The envelope 610 is then in the form of an arcuate range centered on a mean curve 62. The mean curve may correspond to data obtained from a torque meter, e.g. during testing.

Consequently, the manufacturer then establishes an accuracy margin Mrg corresponding to half the accuracy range of the envelope 610, and thus to the distance between the mean curve 62 and an upper limit 63 or a lower limit 64 of the envelope 610.

Furthermore, the manufacturer establishes an assumed power value Vforf that varies as a function of the stage of flight. This assumed power value Vforf is stored in the memory 37.

For example, the assumed power value Vforf is equal to a first constant when the aircraft is flying at a speed of advance that is less than a predetermined speed threshold. The assumed power value Vforf is then equal to a second constant when the aircraft is flying at a speed of advance greater than or equal to the predetermined speed threshold.

Under such circumstances, the processor unit 30 determines the current data flight of the aircraft 1, e.g. by consulting the air data computer 45. This processor unit then deduces the assumed power value Vforf that corresponds to the current flight stage.

Furthermore, the processor unit determines the intermediate value Vint corresponding to the current position POSACTU by means of the power relationship 60.

Under such circumstances, the processor unit determines a non-reduced calculation value V1 that is equal to said intermediate value Vint corrected by each current value.

If the determined calculation value V1 is less than the assumed power value Vforf, then the processor unit adds the accuracy margin Mrg to the calculation value V1 in order to obtain the calculated value Vcal.

This calculated value Vcal is also bounded by an upper bound equal to the current assumed power value Vforf. Consequently, if the sum of the accuracy margin Mrg plus the calculation value V1 is greater than the current assumed power value Vforf, then the calculated value Vcal is equal to said assumed power value Vforf. Otherwise, the calculated value Vcal is equal to said sum.

If the calculation value V1 as determined is greater than the assumed power value Vforf, then the processor unit subtracts the accuracy margin Mrg from the calculation value V1 in order to obtain the calculated valve Vcal.

This calculated value Vcal is also bounded by a lower bound equal to the current assumed power value Vforf. Consequently, if the difference between the calculation value V1 and the accuracy margin Mrg is less than the current assumed power value Vforf, then the calculated value Vcal is equal to said assumed power value Vforf. Otherwise, the calculated valve Vcal is equal to said difference.

This method amounts to establishing an estimated curve.

Naturally, the present invention may be subjected to numerous variations as to its implementation. Although several implementations are described, it will readily be understood that it is not conceivable to identify exhaustively all possible implementations. It is naturally possible to envisage replacing any of the means described by equivalent means without going beyond the ambit of the present invention.

What is claimed is:

1. A method of monitoring a power transmission system of an aircraft, the aircraft including at least one main rotor driven in rotation by the power transmission system, the power transmission system comprising a main gearbox connected to the main rotor by at least one rotor mast, the aircraft including an auxiliary unit with an auxiliary rotor and a mechanical assembly of the power transmission system, the mechanical assembly mechanically connecting the auxiliary rotor to the main gearbox, the aircraft including a power plant comprising at least one engine for driving the main gearbox, the aircraft including control means for controlling the auxiliary rotor, the method comprising the following steps:
determining a power relationship providing a first power parameter for the auxiliary unit as a function of a position (POSACTU) of the control means, the first power parameter being a power parameter reduced by at least one reduction variable;
setting a setpoint limit (Prot) for a second power parameter for the rotor mast;
determining a current position (POSACTU) of the control means;
determining an "intermediate" value (Vint) of the first power parameter corresponding to the current position (POSACTU) in application of the power relationship;
measuring a "current" value (Vactu) of each reduction variable;
correcting the intermediate value (Vint) at least by using each current value (Vactu) in order to obtain a non-reduced value referred to as the "calculated" value (Vcal); and
determining a "limit" value (Peng) that is not to be exceeded by a monitoring parameter of the power plant, the limit value (Peng) being equal to the sum of at least the setpoint limit (Prot) plus the calculated value (Vcal).

2. A method according to claim 1, wherein the setpoint limit (Prot) is an authorized power limit on the rotor mast.

3. A method according to claim 1, wherein the limit value is:
either equal to the sum of the setpoint limit (Prot) plus the calculated value (Vcal);
or else equal to the sum of the setpoint limit (Prot) plus the calculated value (Vcal) plus a predetermined takeoff power (Pext).

4. A method according to claim 1, wherein the limit value is a power and the limit value (Peng) is used to obtain for each engine a respective limit torque (Tqlim) that is not to be exceeded.

5. A method according to claim 4, comprising the following steps:
measuring a current torque (Tqactu) developed by each engine; and
comparing the current torque (Tqactu) of an engine with the associated limit torque (Tqlim).

6. A method according to claim 1, wherein at least one reduction variable is a variable measured by an air data computer of the aircraft.

7. A method according to claim 6, wherein at least one reduction variable is selected from a list comprising at least one of the following parameters: the relative density ($\sigma$) of the air; the temperature and the pressure of the outside air; a speed of advance of the aircraft; and a vertical speed of the aircraft.

8. A method according to claim 1, wherein the calculated value is equal to the intermediate value (Vint) corrected by each current value.

9. A method according to claim 1, wherein in order to determine the calculated value (Vcal), the following steps are performed:
determining a current flight stage of the aircraft;
determining an assumed power value (Vforf) as a function of the current flight stage;
determining a non-reduced calculation value equal to the intermediate value (Vint) corrected by each current value; and
if the calculation value is less than the assumed power value (Vforf), the calculated value (Vcal) is equal to the sum of a predetermined accuracy margin (Mrg) plus the calculation value, the calculated value (Vcal) being bounded by the assumed power value (Vforf) in order to be no greater than the assumed power value (Vforf); or
if the calculation value is greater than the assumed power value (Vforf), the calculated value (Vcal) is equal to the difference of the calculation value minus the accuracy margin (Mrg), the calculated value being bounded by the assumed power value (Vforf) so as to be no less than the assumed power value (Vforf).

10. A method according to claim 9, wherein the assumed power value (Vforf) is equal to a first constant while the aircraft is flying at a speed of advance less than a predetermined speed threshold, and the assumed power value (Vforf) is equal to a second constant while the aircraft is flying at a speed of advance greater than or equal to the predetermined speed threshold.

11. A monitoring device for monitoring a power transmission system of an aircraft, the aircraft including at least one main rotor driven in rotation by the power transmission system, the power transmission system comprising a main gearbox connected to the main rotor by at least one rotor mast, the aircraft including an auxiliary unit with an auxiliary rotor and a mechanical assembly of the power transmission system, the mechanical assembly mechanically connecting the auxiliary rotor to the main gearbox, the aircraft including a power plant comprising at least one engine for driving the main gearbox, the aircraft including control means for controlling the auxiliary rotor, wherein the monitoring device is designed to apply the method according to claim 1, the monitoring device comprising a processor unit having calculation means and a memory, the memory storing instructions together with the power relationship and the setpoint limit, the monitoring device further comprising a measurement system for measuring a current position (POSACTU) of the control means, the processor unit being connected to the measurement system, and the calculation means executing the instructions in order to apply the above method.

12. A device according to claim 11, wherein the monitoring device includes an air data computer connected to the processor unit.

13. A device according to claim 11, wherein the monitoring device includes one torque meter per engine measuring a current torque on a shaft extending between the engine and the main gearbox.

14. A device according to claim 11, wherein the monitoring device includes a display device for displaying a limit that is a function of the limit value.

15. An aircraft including at least one main rotor driven in rotation by a power transmission system, the power transmission system comprising a main gearbox connected to the main rotor by at least one rotor mast, the aircraft including an auxiliary unit with an auxiliary rotor and a mechanical assembly of the power transmission system, the mechanical assembly mechanically connecting the auxiliary rotor to the main gearbox, the aircraft including a power plant comprising at least one engine for driving the main gearbox, the aircraft including control means for controlling the auxiliary rotor, wherein the aircraft includes a monitoring device according to claim 11.

* * * * *